April 29, 1952 W. L. LINCOLN 2,594,942
SHEET METAL CLAMP OPERATING TOOL
Filed Feb. 19, 1949 2 SHEETS—SHEET 1

INVENTOR
WYLYS L. LINCOLN
BY
ATTORNEYS

April 29, 1952 W. L. LINCOLN 2,594,942
SHEET METAL CLAMP OPERATING TOOL
Filed Feb. 19, 1949 2 SHEETS—SHEET 2

INVENTOR
WYLYS L. LINCOLN
BY
ATTORNEYS

Patented Apr. 29, 1952

2,594,942

UNITED STATES PATENT OFFICE 2,594,942

SHEET METAL CLAMP OPERATING TOOL

Wylys L. Lincoln, Los Angeles, Calif., assignor to Monogram Manufacturing Company, Los Angeles, Calif., a corporation of California Application February 19, 1949, Serial No. 77,312

4 Claims. (Cl. 29—268)

This invention relates to improvements in pliers-like tools used for operating spring loaded sheet metal clamps and the like.

Sheet metal clamps of the type most generally used are shown, for instance, by United States Letters Patent 2,266,929. Briefly described, they comprise a tubular body having a reduced opening at its outer end, and one or more spring loaded clamping pins are mounted in the body to reciprocate through the reduced opening, the outer ends of the pins having lateral projections to engage a work sheet adjacent a perforation in the sheet through which the pins are inserted. A coil spring around the pins urges them retracted. To protract the pins preparatory to inserting them in a hole in a work sheet to be clamped, it is necessary to use a tool to overcome the retractive pressure of the spring. While there are "gun" type tools for this purpose which move the pins in a direction truly axially of the clamp body, the tool most commonly used is a pliers-like clamp tool which is much lighter in weight, less bulky and more economical. However, all the pliers-like tools of which I am aware have the shortcoming that they tend to bend the clamp pins in an arc because the jaws necessarily move in an arc. This tends to deform and distort the clamp pins.

It is an object of this invention to overcome those difficulties and shortcomings of the pliers-like clamp operating tool and to provide a tool of this type which maintains the clamp and its parts in straight and unbent condition throughout the clamp compressing movement of the jaws of the tool.

It is another object of my invention to provide a sheet metal clamp operating tool of the pliers-like type which does not tend to deform or distort the clamp.

Other objects which are more or less subordinate to the above stated objects will become apparent from the following description of one specific construction embodying the invention, for which purpose I shall refer to the accompanying drawings, in which.

Figure 1:
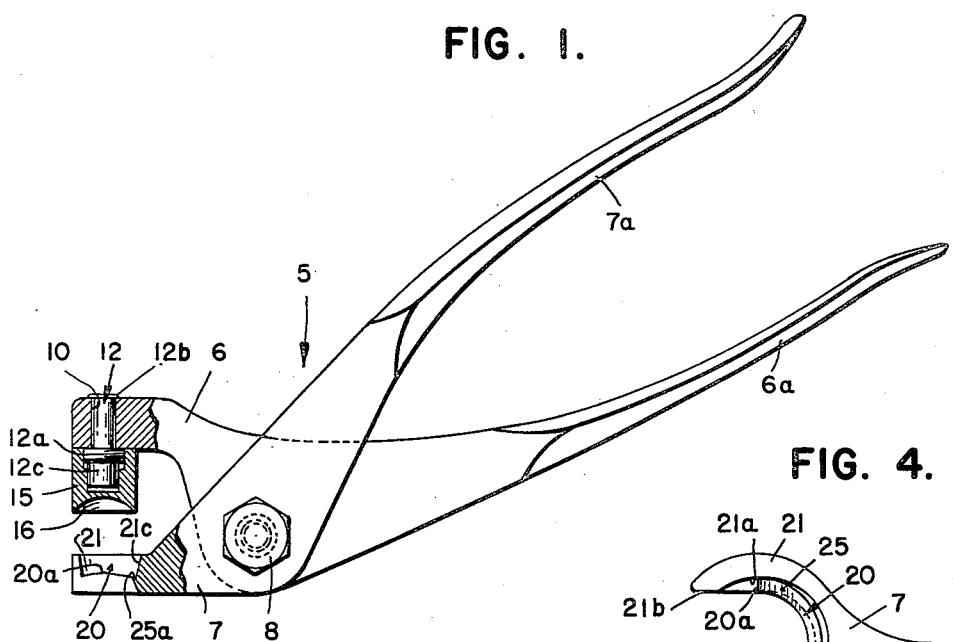
Fig. 1 is a view partly in side elevation and partly in section of a tool embodying one adaptation of my invention.
Figure 4:
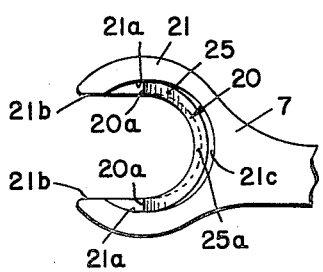
Fig. 4 is a section taken on line 4—4 of Fig. 2.

Referring now to the drawings, Figs. 1-5, the tool is generally denoted by the numeral 5 and has an upper jaw 6 and a lower jaw 7 pivotally connected together by pin 8 for pliers-like swinging movement relative to each other.

The jaws have handle portions 6a, 7a, respectively, so as to be conveniently operated by one hand.

Upper jaw 6 has a transverse hole 10 adjacent its front end, in which hole a stud 12 fits, the stud having an enlarged exteriorly threaded portion 12a, having its top end peened at 12b to prevent axial movement in the hole, and having a portion 12c depending from the threaded portion.

A clamp engaging sleeve-like member 15 has an axial bore to receive portions 12a and 12c of the stud, and is interiorly threaded to receive the portion 12a. The lower end of the member 15 is provided with a recess defined by the spherical surface 16. For different sized clamps it is therefore a simple matter to remove one member 15 and substitute another for it on the tool.

The lower jaw 7 is forked at its outer end and provides an arcuate clamp engaging shoulder 20, the shoulder being recessed in the jaw below the top surface 21. While the side wall 21a of the upper half of the jaw is curved to fairly closely receive the round body portion a of a sheet metal clamp C, the outer ends 21b of the side walls 21a are spaced apart a distance slightly less than the diameter of portion a of the clamp body, so that the clamp may not accidentally escape from the jaw. That is, in order to remove the clamp, it must be lifted upwardly from the cradle provided by the jaw until portion a is above the plane 21 of the top of the jaw.

For the purposes to be described, the shoulder has diametrically opposite high points 20a from which the surface of the shoulder angles downwardly towards its ends about 9° from the high points 20a, being the points at which the shoulder is engaged by the annular shoulder b of the clamp. Also, the back portion 21c of the side wall 21a angles or flares upwardly and outwardly about 9°, while the back portion 25a of the inner side wall of the lower half 25 of the jaw angles or flares downwardly and outwardly, all as best seen in Figs. 1 and 2.

It will be seen that the angular surfaces 21c and 25a permit the clamp body to rock backwardly and forwardly on the pivotal point formed by the high points 20a of the shoulder.

Figure 2:
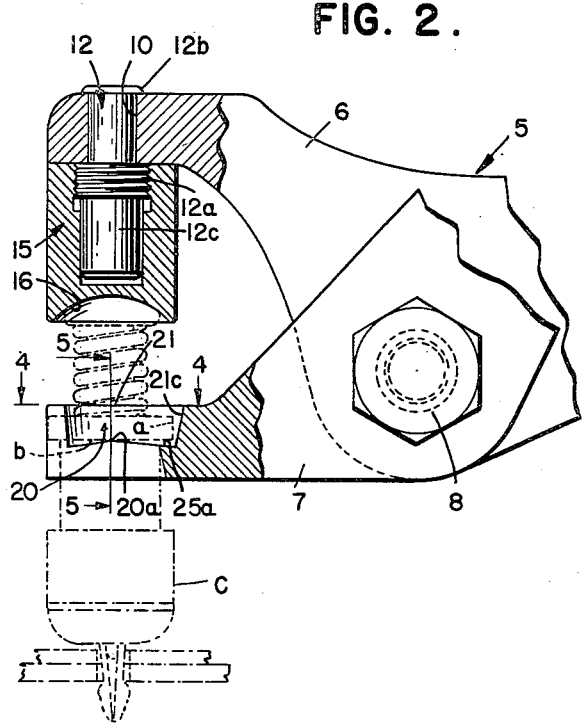
Fig. 2 is an enlarged fragmentary view, partly in side elevation and partly in section, showing the device of Fig. 1 in clamp-compressing position, a portion of the lower jaw being broken off, and the clamp being shown in broken lines.
Figure 5:
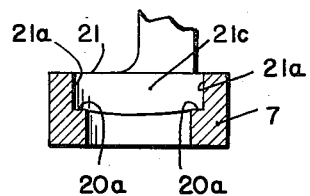
Fig. 5 is a section taken on line 5—5 of Fig. 2.

The member 15 and stud 12 provide a depending projection from the upper jaw which renders it unnecessary to swing the upper jaw farther downwardly than as shown in Fig. 2 in order to fully compress the clamp. In other words, if the jaws were swung farther together than shown in Fig. 2, they would tend to bend the clamp C about an inward arc, which is rendered unnecessary by the projection.

Figure 3:
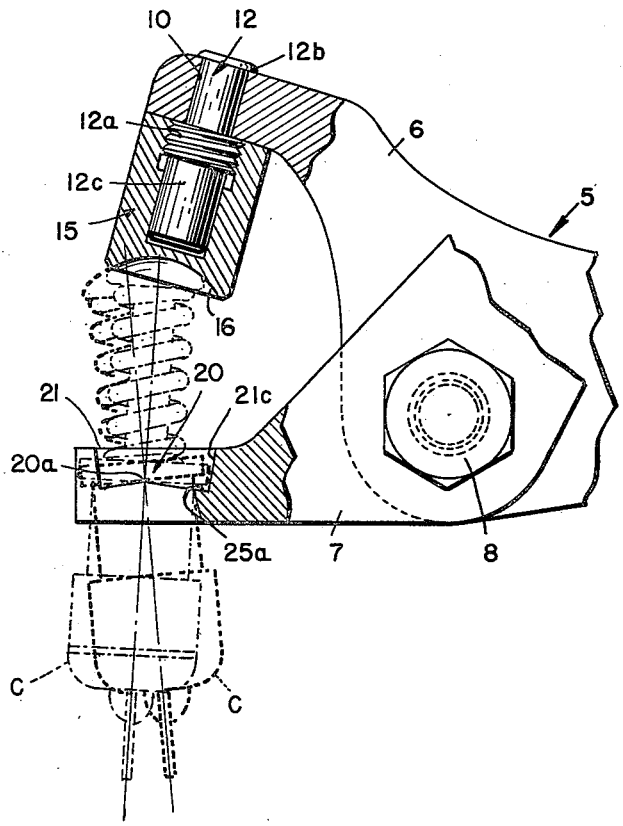
Fig. 3 is a view similar to Fig. 2 but showing the tool at the start of the clamp-compressing operation.

Starting with the position of Fig. 3, it will be seen that the clamp rests against angular surface 21c and that the top end of the clamp is not centered in the recess 16. As the jaws swing towards each other from that position, the top end of the clamp moves along the spherical surface 16 until it becomes centered, and in the course of the swinging movement of the jaws towards each other, the clamp is free to pivot on the point 20a by virtue of the angular surfaces 21c and 25a, so that at all times the clamp is held straight while its spring is being compressed.

Figure 6:
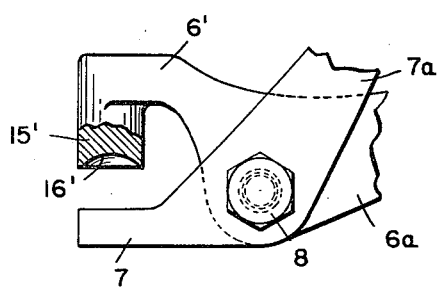
Fig. 6 is a view partly in side elevation and partly in section of a modified form of device.

In Fig. 6 I show a modified form of the invention in which the parts are as before described excepting only that in lieu of the separate elements 12 and 15 being assembled in the upper jaw, they form integral parts thereof. For instance, the jaw 6' has an integral projection 15' presenting a spherical recess 16' to engage the inner end of the clamp being operated.

I find that by using my clamp operating tool, in comparison with other tools, sheet metal clamps last considerably longer.

I claim:

1. In a tool for holding and operating a sheet metal clamp, a pair of opposed jaws having handle portions, means pivoting the jaws together for relative swinging movement about an axis transverse of the jaws, one of the jaws having a pair of transversely spaced clamp engaging shoulders facing the other jaw, said shoulders having a pair of transversely spaced, transversely alined relatively high points projecting toward the other jaw, about which high points said clamp may rock; and the other jaw being disposed to engage an opposite portion of said clamp.

2. In a tool for holding and operating a sheet metal clamp having an elongated housing and a longitudinally outwardly facing, radially extending shoulder on said housing, a pair of opposed jaws having handle portions, the jaws being pivotally connected together between their ends for pliers-like swinging movement relative to each other, a first one of the jaws being bifurcated, the centrally facing walls of the bifurcations being stepped to form a shoulder surface at a distance above the lower edges of said walls, said shoulder surface facing inwardly toward the other jaw for engaging the said outwardly facing clamp housing shoulder, said inwardly facing shoulder surface presenting substantially diametrically opposite localized areas which are relatively nearer the second jaw and which are disposed on a line across the space between the bifurcations of the first jaw, said line being substantially parallel to the axis of said pivot, and about which localized areas said engaged clamp may rock, and the other jaw being disposed to engage the inner portion of said clamp.

3. The combination as described in claim 2, in which the centrally facing walls of the bifurcations above the shoulder flare slightly upwardly and divergingly at an angle which increases from zero, in each direction from the localized areas, as the distance from the said localized areas increases, and the surface of the shoulder extending in either direction from the localized areas lies in a plane embracing the localized areas which is at a slight angle to the axis of the jaw so that the surface of the shoulder extends deeper into the body of the jaw, whereby a support is provided for the shoulder on the clamp housing in either of the two directions of its rocking movement.

4. In a tool for holding and operating a sheet metal clamp, having an elongated housing and an outwardly facing, radially extending shoulder on said housing, a pair of opposed jaws having handle portions, the jaws being pivotally connected together between their ends for pliers-like swinging movement relative to each other, a first one of the jaws being bifurcated in the form of an interrupted ring, the centrally facing walls of the bifurcations being stepped to form an arcuate shoulder surface at a distance above the lower edges of said walls, said shoulder surface facing inwardly toward the other jaw for engaging the said outwardly facing clamp housing shoulder, said inwardly facing shoulder surface having an outside bounding diameter greater than the opening between the ends of the bifurcations and presenting substantially diametrically opposite localized areas which are relatively nearer the second jaw and which are disposed on a diametric line across the opening between the bifurcations of the first jaw, said line being substantially parallel to the axis of said pivot and about which localized areas said engaged clamp may rock, said second jaw having a projection extending toward the first jaw, said projection having a concave spherical end surface facing the first jaw for engaging the inner end of the clamp and facilitating said rocking movement.

WYLYS L. LINCOLN.

REFERENCES CITED

The following references are of record in the file of this patent:

UNITED STATES PATENTS

| Number | Name | Date |
| --- | --- | --- |
| 1,536,241 | Sroka | May 5, 1925 |
| 2,328,866 | Van Sittert et al. | Sept. 7, 1943 |
| 2,352,722 | Lipp | July 4, 1944 |
| 2,478,881 | Wayrynen | Aug. 9, 1949 |